United States Patent
Pons

(10) Patent No.: US 10,124,629 B2
(45) Date of Patent: Nov. 13, 2018

(54) PNEUMATIC TIRE WITH SIPE ACTIVATION BOOSTERS

(71) Applicant: The Goodyear Tire & Rubber Company, Akron, OH (US)

(72) Inventor: Frédéric Michel-Jean Pons, Thionville (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 834 days.

(21) Appl. No.: 14/522,966

(22) Filed: Oct. 24, 2014

(65) Prior Publication Data

US 2016/0114631 A1    Apr. 28, 2016

(51) Int. Cl.
| B60C 11/00 | (2006.01) |
| B60C 11/12 | (2006.01) |
| B60C 11/13 | (2006.01) |
| B60C 11/11 | (2006.01) |

(52) U.S. Cl.
CPC .............. B60C 11/13 (2013.01); B60C 11/11 (2013.01); B60C 11/12 (2013.01); B60C 11/1236 (2013.01); B60C 11/1376 (2013.01); B60C 2011/1209 (2013.01); B60C 2011/133 (2013.01)

(58) Field of Classification Search
CPC . B60C 11/12; B60C 11/1204; B60C 11/1259; B60C 11/1263; B60C 11/1272; B60C 11/1281
See application file for complete search history.

(56) References Cited

U.S. PATENT DOCUMENTS

| 4,122,879 A | 10/1978 | Takigawa |
| 6,026,875 A | 2/2000 | Diensthuber et al. |
| 6,378,583 B1 | 4/2002 | Fontaine |
| 6,382,283 B1 | 5/2002 | Caretta |
| 6,430,993 B1 | 8/2002 | Seta |
| 6,564,625 B1 | 5/2003 | Ishiyama |
| 6,575,215 B1 | 6/2003 | Hino et al. |
| 6,866,076 B2 | 3/2005 | Ohsawa |
| 7,306,019 B2 | 12/2007 | Kurokawa |
| 7,954,527 B2 | 6/2011 | Ohara |
| 8,261,789 B2 | 9/2012 | Niknam et al. |
| 8,511,357 B2 | 8/2013 | Matsumoto |
| 8,757,229 B2 | 6/2014 | Knispel |
| 2009/0101260 A1 | 4/2009 | Ikegami |

FOREIGN PATENT DOCUMENTS

| JP | H061119 A | 1/1994 |
| JP | H0616016 A | 1/1994 |

OTHER PUBLICATIONS

European Search Report dated Mar. 8,2016 for Application Serial No. EP15189417.

*Primary Examiner* — Justin R Fischer
(74) *Attorney, Agent, or Firm* — Robert N. Lipcsik

(57) ABSTRACT

A tread for a pneumatic tire includes a plurality of trapezoidal channels, each trapezoidal channel extending circumferentially from a first end to a second end, the first end being wider than the second end, a sipe extending laterally adjacent the second ends of the trapezoidal channels, and a plurality of rectangular channels, each rectangular channel extending circumferentially from a first end to a second end, the first ends of the rectangular channels being adjacent the sipe.

3 Claims, 2 Drawing Sheets

PNEUMATIC TIRE WITH SIPE ACTIVATION BOOSTERS

FIELD OF THE INVENTION

The present invention relates to a pneumatic tire with improved gripping force on a frozen road surface or a snow covered road surface.

BACKGROUND OF THE INVENTION

In conventional pneumatic tires, particularly studless winter tires, various conventional methods attempt to improve performance on ice or snow. As a way for increasing a friction coefficient on an ice-snow road surface, grooves may be microscopically formed by using a short fiber-containing foamed rubber as a tread rubber and breaking away the short fibers exposed on a surface of the tread accompanied with the wearing of the tread rubber during the normal operation.

However, the microscopic grooves formed on the tread may be crushed as a load applied to the tire becomes large, and hence the effect of increasing the friction coefficient on the ice-snow road surface may not be sufficiently obtained. Also, the short fibers may be embedded in a foamed rubber at a state of extending in a straight line and substantially in parallel to a worn face of the tread. Thus, when the tread is worn, the short fibers exposed on the worn face of the tread may rapidly break away and degrade traction.

The short fibers may actually and frequently be embedded in the foamed rubber at a state of being curled through heat shrinkage in the vulcanization or pushing of the fibers into a groove portion of a mold part or a sipe portion to bend in the tread rubber. In this case, even if the tread is worn during the running, the short fibers substantially parallel to the worn face of the tread cannot easily be broken away from the foamed rubber, so that the microscopic grooves as originally intended cannot function efficiently.

Another conventional method for ensuring acceptable performance on ice or snow, tread rubber may contain closed spherical cells. Ice or snow may thaw to water by friction heat when the tread contacts the ice-snow road surface. This water may form a water membrane between the tread and the ice-snow road surface thereby deteriorating ice and/or snow performance. In this case, the water membrane may be partially negated by the action of irregularities on the tread formed by the closed spherical cells. Often, this method does not develop the sufficient water-removing effect because the irregularities formed on the tread by the closed cells may be very small.

This water/ice/snow removing effect has been enhanced by many continuous closed cells covered with a protection layer of a resin. These continuous closed cells may form ejection paths whereby water/ice/snow may be removed from the tread contact surface.

SUMMARY OF THE INVENTION

A tread for a pneumatic tire in accordance with the present invention includes a plurality of trapezoidal channels, each trapezoidal channel extending circumferentially from a first end to a second end, the first end being wider than the second end, a sipe extending laterally adjacent the second ends of the trapezoidal channels, and a plurality of rectangular channels, each rectangular channel extending circumferentially from a first end to a second end, the first ends of the rectangular channels being adjacent the sipe.

According to another aspect of the tread, each block of the tread contains the plurality of trapezoidal channels, the sipe, and the plurality of rectangular channels.

A pneumatic tire in accordance with the present invention includes a pair of annular, inextensible beads, a carcass ply extending between the beads, and a tread extending circumferentially around a radially outermost portion of the carcass ply, the tread including at least one tread block, the tread block including a plurality of trapezoidal channels, each trapezoidal channel extending circumferentially from a first end to a second end, the first end being wider than the second end, a sipe extending laterally adjacent the second ends of the trapezoidal channels, and a plurality of rectangular channels, each rectangular channel extending circumferentially from a first end to a second end, the first ends of the rectangular channels being adjacent the sipe.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DESCRIPTION OF AN EXAMPLE OF THE PRESENT INVENTION

Figure 1:
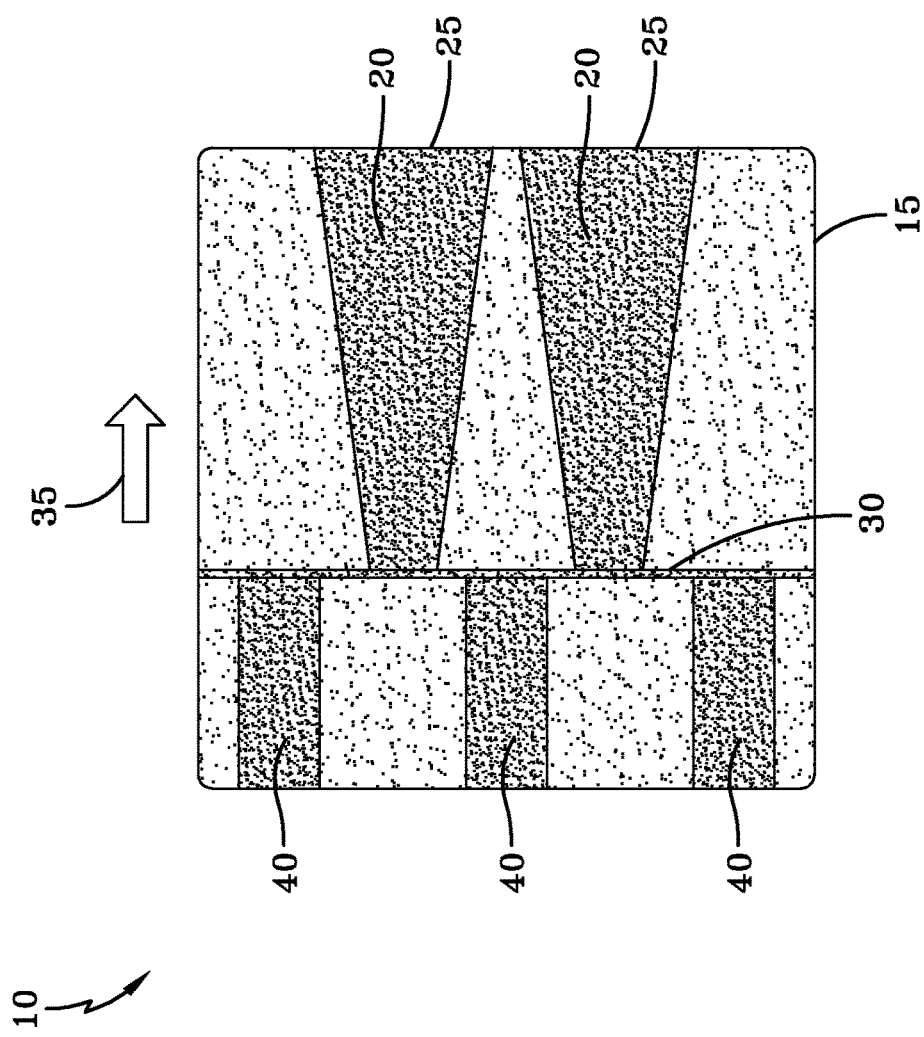
FIG. 1 is a schematic orthogonal view of a tire tread in accordance with the present invention.

As shown in FIG. 1, sipes may be used in winter tire tread designs to enhance the snow performance of pneumatic tires. Block edges of the tread may be increased for improving snow grip. However, increased block edges necessitates an increase in sipes, grooves, and/or spaces where snow may become captured and defeat the purpose of the increased block edges. In accordance with the present invention, the tread blocks may be staggered in order to decouple the sipes, grooves, and/or spaces and prevent snow from remaining in the sipes, grooves, and/or spaces. One example conventional winter tread is disclosed by U.S. Pat. No. 8,757,229, herein incorporated in its entirety by reference.

Figure 2:
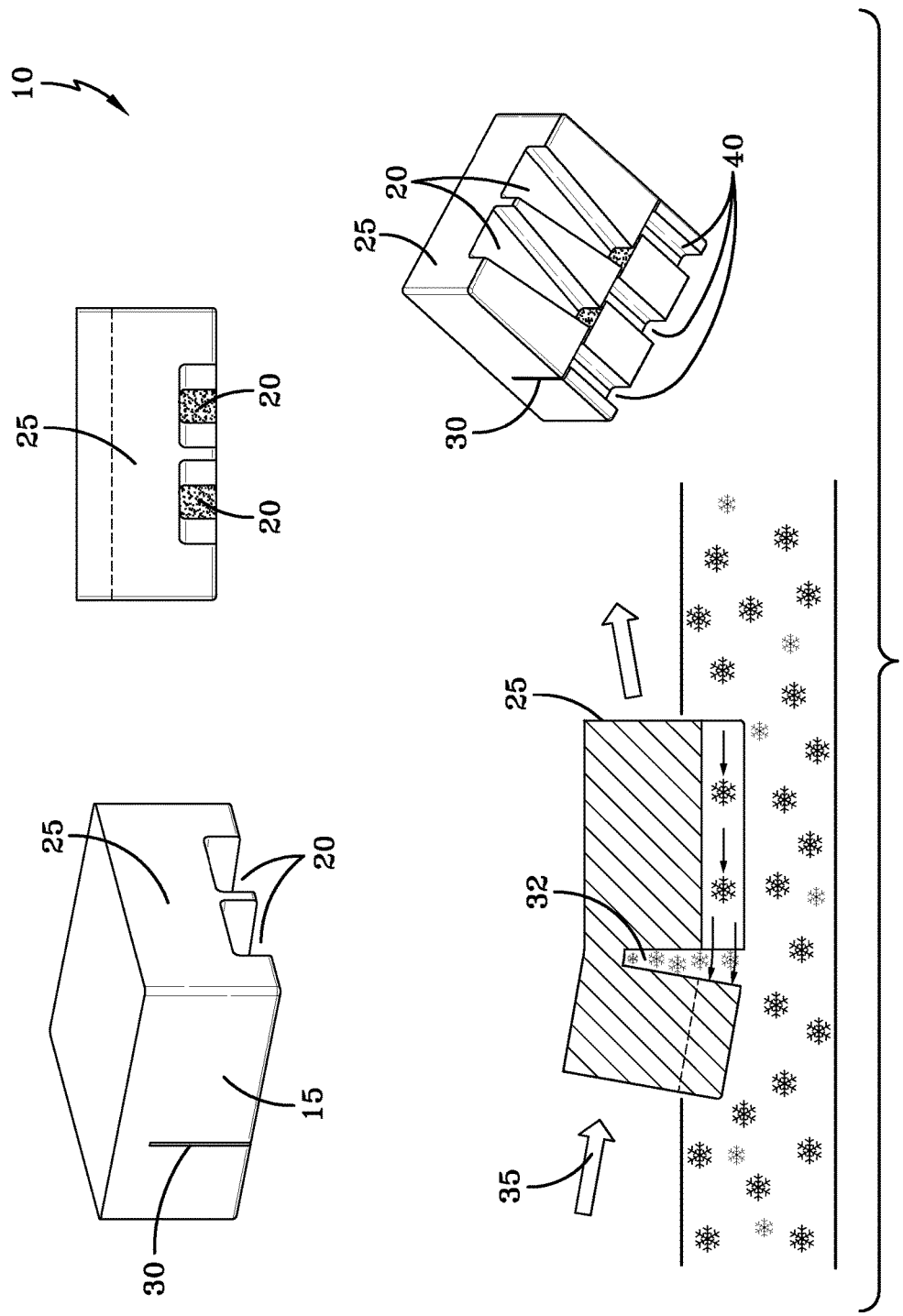
FIG. 2 is a schematic perspective/sectional view of the functioning of the tire tread of FIG. 1.

One example tread 10 in accordance with present invention is shown in FIG. 1. Trapezoidal circumferential channels 20 may operate to feed snow to a transverse sipe 30 extending perpendicularly to the rotation direction 35 of the tread 10. These trapezoidal circumferential channels 20 extend in the rotation direction 35 thereby allowing snow to enter at the wider end 25. These channels 20 may alternatively have a rectangular shape when viewed radially into the tread 10. The channels 20 may have a circular, a square, a rectangular, and/or a trapezoidal shape when view in cross-section in the rotation direction 35. The sipe 30 may join the trapezoidal channels to rectangular circumferential channels 40 that are axially, or transversely, staggered relative to the trapezoidal channels 20. The two rows of channels 20, 40 may located on a single tread block 15. The trapezoidal channels 20 may "open-up" the sipe 30 when the pneumatic tire is rotating at a constant speed or accelerating (FIG. 2). The rectangular channels 40 may "open-up" the sipe 30 when pneumatic tire is decelerating, or braking (FIG. 2).

This functioning of the tread 10 allows increased and quicker snow jam into the sipe 30 by generating a more efficient sipe opening 32 and an increase in snow performance of the pneumatic tire. Due to this greater efficiency of the sipe 30, sipe depths may be reduced to increase overall tread pattern stiffness (e.g., ride and handling improvement).

While the present invention has been particularly shown and described with reference to particular examples thereof, it will be understood by those skilled in the art that various changes may be made and equivalents substituted for elements thereof without departing from the broad scope of the present invention. In addition, many modifications may be made to adapt a particular situation or material to the teachings of the present invention without departing from the recited scope thereof. Therefore, it is intended that the present invention not be limited to the particular examples disclosed herein, but that the present invention may include all examples falling within the scope of the appended claims.

What is claimed:

1. A tread for a pneumatic tire comprising:
   a plurality of trapezoidal channels, each trapezoidal channel extending circumferentially from a first end to a second end, the first end being wider than the second end;
   a sipe extending laterally adjacent the second ends of the trapezoidal channels; and
      a plurality of rectangular channels, each rectangular channel extending circumferentially from a first end to a second end, the first ends of the rectangular channels being adjacent the sipe,
   the sipe being circumferentially aligned with both the second ends of the trapezoidal channels and the first ends of the rectangular channels.

2. The tread as set forth in claim 1 wherein the each block of the tread contains the plurality of trapezoidal channels, the sipe, and the plurality of rectangular channels.

3. A pneumatic tire comprising:
   a pair of annular, inextensible beads;
   a carcass ply extending between the beads; and
   a tread extending circumferentially around a radially outermost portion of the carcass ply, the tread including at least one tread block, the tread block including:
   a plurality of trapezoidal channels, each trapezoidal channel extending circumferentially from a first end to a second end, the first end being wider than the second end;
   a sipe extending laterally adjacent the second ends of the trapezoidal channels; and
   a plurality of rectangular channels, each rectangular channel extending circumferentially from a first end to a second end, the first ends of the rectangular channels being adjacent the sipe,
   the sipe being circumferentially aligned with both the second ends of the trapezoidal channels and the first ends of the rectangular channels.

\* \* \* \* \*